(12) United States Patent
Fessler et al.

(10) Patent No.: US 8,118,233 B2
(45) Date of Patent: Feb. 21, 2012

(54) PRINTING DEVICE FOR PRINTING OF RADIO FREQUENCY IDENTIFICATION (RFID) LABELS

(75) Inventors: John Thomas Fessler, Lexington, KY (US); Swetha Puligalla, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 326 days.

(21) Appl. No.: 12/474,393

(22) Filed: May 29, 2009

(65) Prior Publication Data

US 2010/0303531 A1    Dec. 2, 2010

(51) Int. Cl.
*G06K 19/06* (2006.01)
(52) U.S. Cl. ............ 235/492; 340/10.1; 340/572.7
(58) Field of Classification Search ............. 235/492; 340/10.1, 572.7
See application file for complete search history.

(56) References Cited

U.S. PATENT DOCUMENTS

| 2008/0315997 A1* | 12/2008 | Yamaguchi ............... 340/10.1 |
| 2009/0072019 A1* | 3/2009 | Shibata et al. ............. 235/375 |
| 2009/0167505 A1* | 7/2009 | Ohashi et al. ............ 340/10.51 |
| 2010/0186612 A1* | 7/2010 | Sugiyama ................. 101/288 |

* cited by examiner

*Primary Examiner* — Allyson Trail

(57) ABSTRACT

Disclosed is a printing device for printing Radio Frequency Identification (RFID) labels. The printing device includes an input media drawer configured to receive a plurality of RFID labels including RFID tags and an RFID label processing mechanism operatively coupled to the input media drawer. The RFID label processing mechanism includes a radio system for providing a signal for processing of the at least one RFID tag received from the input media drawer, and an antenna module coupled to the radio system for processing the at least one RFID tag based on the signal received from the radio system. The antenna module includes a transmission line including serially connected, a first set of horizontal legs and a second set of vertical legs. Further, the printing device includes a printing mechanism operatively coupled to the RFID label processing mechanism for printing the RFID labels.

23 Claims, 4 Drawing Sheets

PRINTING DEVICE FOR PRINTING OF RADIO FREQUENCY IDENTIFICATION (RFID) LABELS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Disclosure

The disclosure relates generally to media processing devices, and, more particularly, to printing devices for printing of Radio Frequency Identification (RFID) labels.

2. Description of the Related Art

Printing devices, such as laser printers, are nowadays equipped with RFID technology to print RFID labels along with ordinary printing, such as paper printing. These printing devices cater to printing of physical media containing RFID labels, for example, stick-on labels, tickets, packing slips, shipping labels and price labels. RFID labels may include RFID tags placed on sheets of the RFID labels. The RFID labels including the RFID tags are fed into the printing devices for the printing purposes. These printing devices have capability of processing RFID tags placed on the RFID labels. Herein the term 'processing' of an RFID tag refers to actions, such as reading, writing and verifying the RFID tag on an RFID label.

Traditional printing device for printing of RFID labels, such as a Lexmark® T640rn RFID business printer employ mechanisms, such as combining RFID technology with laser printing technology. Further, as an advancement, printing device manufacturers have developed another mechanism for printing the RFID labels by adding RFID Ultra High Frequency (UHF) tray options to existing printers, such as Lexmark® T64x series laser printers. Both of the mechanisms support far field RFID tag communications. However, the orientations of the RFID tags on the RFID labels in Lexmark® T640rn printer are vertical only, and the orientations of the RFID tags on the RFID labels in printers having UHF tray options are horizontal. Printers with the RFID UHF options prove to be a customer friendly installable option, and their costs are also significantly less when compared to the traditional printing device for printing of the RFID labels. An RFID UHF option generally includes an input media tray capable of containing the RFID labels to be programmed, and an RFID hardware including a radio and an antenna.

As the existing mechanisms employed for the printing of the RFID tags restrict the placement of the RFID tags in either the horizontal field or the vertical field, it may be possible to support the placement of the RFID tags in both the horizontal and vertical fields upon using antenna designs such as circular patch antennas and two dipole antennas into the existing RFID UHF option. However, it may be very difficult to integrate such antenna designs into existing RFID UHF options due to space limitations. Further, customers having printers and RFID UHF options integrated with the printers may need to input the orientation of the RFID tags and may also need to switch antennas of the RFID UHF options appropriately in order to communicate to the RFID tags having different orientations. Also, the customers may use two RFID UHF options along with the existing printers if they want to read both the horizontal and vertical orientations of the RFID tags, which may be an expensive solution and also may not be customer-friendly in operation.

Based on the foregoing, there is a need for a printing device having a single antenna that may communicate to RFID tags of both orientations, i.e. the horizontal orientation and the vertical orientation. Further, this single antenna design should eliminate a requirement to buy an extra RFID UHF option along with the printing device to support both orientations of the RFID tags.

SUMMARY OF THE DISCLOSURE

In view of the foregoing disadvantages inherent in the prior art, the general purpose of the present disclosure is to provide a printing device for printing RFID labels to include all the advantages of the prior art, and to overcome the drawbacks inherent therein. Specifically, the present disclosure describes a printing device for printing RFID labels that supports both the vertical and horizontal placement of tags on a label.

Therefore, in one aspect, the present disclosure provides a printing device including an input media drawer, an RFID label processing mechanism and a printing mechanism. The input media drawer is configured to receive a plurality of RFID labels. Each RFID label of the plurality of RFID labels is configured to include at least one RFID tag. The RFID label processing mechanism is operatively coupled to the input media drawer. The RFID label processing mechanism includes a radio system for providing a signal for processing the at least one RFID tag of each RFID label, where each RFID label is received from the input media drawer. The RFID label processing mechanism also includes an antenna module coupled to the radio system for processing the at least one RFID tag based on the signal received from the radio system.

The antenna module includes a transmission line, where the transmission line has a combination of a first set of horizontal legs and a second set of vertical legs. The first set of horizontal legs and the second set of vertical legs are connected serially such that each horizontal leg adjoins at least one vertical leg and each vertical leg adjoins at least one horizontal leg. The printing mechanism of the printing device is further operatively coupled to the RFID label processing mechanism for printing the plurality of RFID labels.

Further in another aspect, the present disclosure provides an RFID label processing mechanism for use in a printing device for printing of RFID labels. An RFID label is configured to include at least one RFID tag. The RFID label processing mechanism includes a radio system and an antenna module. The radio system is configured to provide a signal for processing of an RFID tag of an RFID label. The antenna module is coupled to the radio system which processes the RFID tag based on the signal provided by the radio system. The antenna module includes a transmission line, where the transmission line has a combination of a first set of horizontal legs and a second set of vertical legs. The first set of horizontal legs and the second set of vertical legs are connected serially such that each horizontal leg adjoins at least one vertical leg and each vertical leg adjoins at least one horizontal leg.

Further in another aspect, the present disclosure provides a printing device including an input media drawer, an RFID label processing mechanism and a printing mechanism. The input media drawer is configured to receive a plurality of RFID labels. Each RFID label of the plurality of RFID labels is configured to include at least one RFID tag. The RFID label processing mechanism is operatively coupled to the input media drawer. The RFID label processing mechanism includes a radio system for providing a signal for processing of the at least one RFID tag of each RFID label, where each RFID label is received from the input media drawer. The RFID label processing mechanism also includes an antenna module coupled to the radio system which processes the at least one RFID tag based on the signal received from the radio system. The antenna module includes a transmission line having one or more transmitting legs configured to activate the at least one RFID tag, which may have a particular orientation. The printing mechanism is further operatively coupled to the RFID label processing mechanism for printing the plurality of RFID labels.

BRIEF DESCRIPTION OF THE DRAWINGS

The above-mentioned and other features and advantages of this present disclosure, and the manner of attaining them, will become more apparent and the present disclosure will be better understood by reference to the following description of embodiments of the disclosure taken in conjunction with the accompanying drawings, wherein.

DETAILED DESCRIPTION

Figure 1:
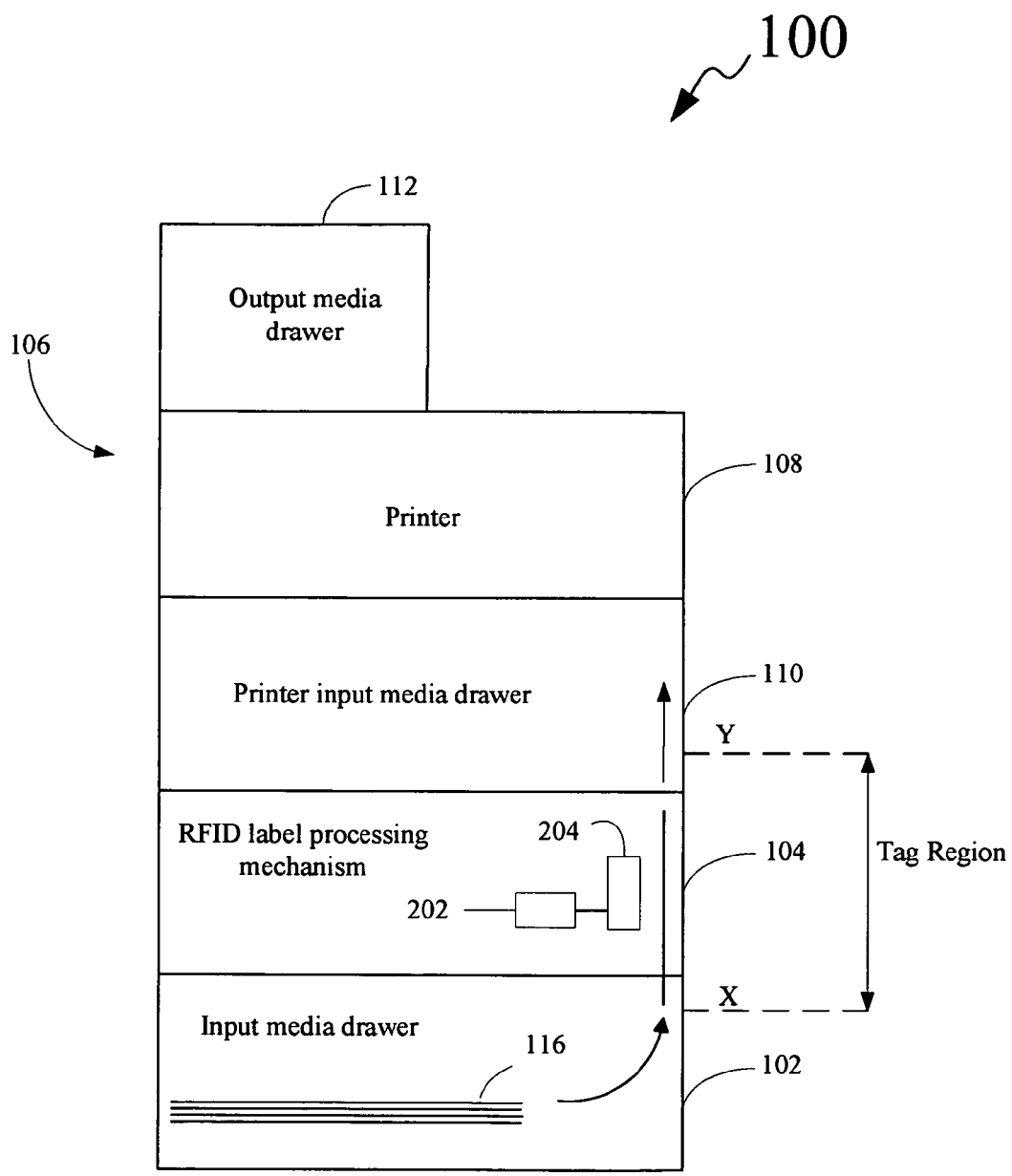
FIG. 1 is a schematic diagram of a printing device, according to an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including" "comprising" or "having" and variations thereof herein is meant to encompass the items listed thereafter and equivalents thereof as well as additional items.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the present disclosure may be implemented in software. As such, it should be noted that a plurality of hardware and software-based devices, as well as a plurality of different structural components may be utilized to implement the present disclosure. Furthermore, and as described in subsequent paragraphs, the specific mechanical configurations illustrated in the drawings are intended to exemplify embodiments of the present disclosure and that other alternative mechanical configurations are possible.

An exemplary schematic diagram of a printing device 100 is shown in FIG. 1, in accordance with an embodiment of the present disclosure. FIG. 1 represents a side view of printing device 100. Printing device 100 includes an RFID option integrated with a printing mechanism. As shown in FIG. 1, the RFID option comprises an input media drawer 102 and an RFID label processing mechanism 104. Further, the printing mechanism is shown as a printing mechanism 106. Printing mechanism 106 may include components of any standard printer known in the art that may support the integration of the RFID option, such as Lexmark's T64x series printers. For exemplary purposes, printing mechanism 106 is represented as including a printer 108 which imparts images, either using toner or ink, on input media, a printer input media drawer 110 and an output media drawer 112. Printer input media drawer 110 is an integrated drawer of printer 108 and is configured to receive an input media. Further, output media drawer 112 represents an output bin, from where a physical media printed by printing mechanism 106 may be collected.

Input media drawer 102 is configured to receive a plurality of RFID labels. Each RFID label may be configured to include at least one RFID tag. An RFID tag may be placed in both horizontal and vertical orientations on an RFID label. The placement of the RFID tag on the RFID label in the horizontal and vertical orientations is described later in this description in conjunction with FIG. 4.

Figure 2:
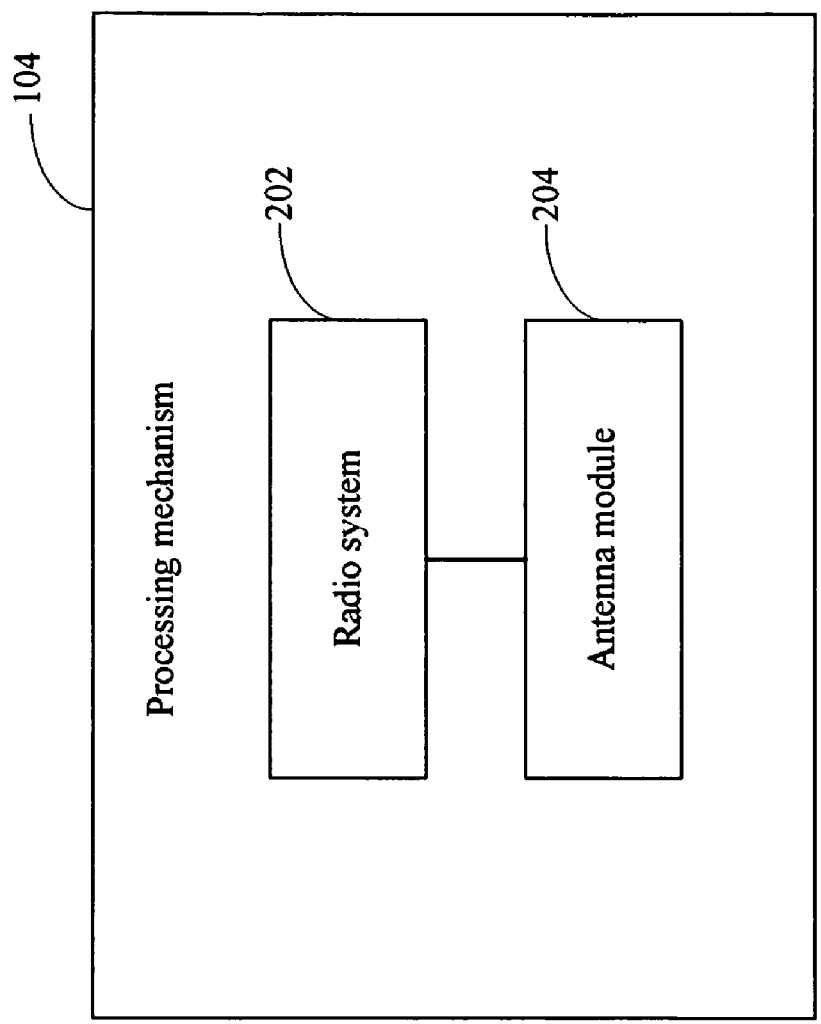
FIG. 2 is a schematic block diagram of a processing mechanism of the printing device, according to an embodiment of the present disclosure.

RFID label processing mechanism 104 (hereinafter referred to as 'processing mechanism 104') is operatively coupled to input media drawer 102. Components of processing mechanism 104 are shown in FIG. 2. Referring now to FIG. 2, processing mechanism 104 comprises a radio system 202 and an antenna module 204. Radio system 202 is configured to provide a signal for processing of the RFID tag of each RFID label. As described, the RFID label is received from input media drawer 102. FIG. 1 shows a stack 116 of RFID labels in input media drawer 102. When the RFID tag attached to the RFID label move through a media path in the printing device 100 past label processing mechanism 104 and in close proximity with antenna module 204, radio system 202 will send appropriate signals to the antenna module 204 for processing of the RFID tag. Antenna module 204 is used to communicate signals between radio system 202 and the RFID tag over the air interface. Radio system 202 may be operatively coupled to a controller or processor (not shown) of printing device 100 for controlling communication with RFID tags disposed on the RFID labels.

Referring again to FIG. 1, RFID media is fed from input media drawer 102 that lies underneath processing mechanism 104, past processing mechanism 104 and towards printer 108 where an image is printed on the RFID label. As shown in FIG. 1, 'x' marks a position where input media drawer 102 is completely loaded with RFID media, i.e., the RFID labels, and 'y' marks an end position for printer input media drawer 110. Antenna module 204 of processing mechanism 104 may be used to activate RFID tags of the RFID labels, which may be present or moving in a media path between the 'x' and 'y' positions (hereinafter referred to as 'tag region'). Antenna module 204 serves to limit the communication range only to the tag region of the media feedpath and avoid activating the RFID tags located in input media drawer 102, printer input media drawer 110 and elsewhere in printing device 100. One exemplary representation of antenna module 204 of processing mechanism 104 is described in conjunction with FIG. 3.

Figure 3:
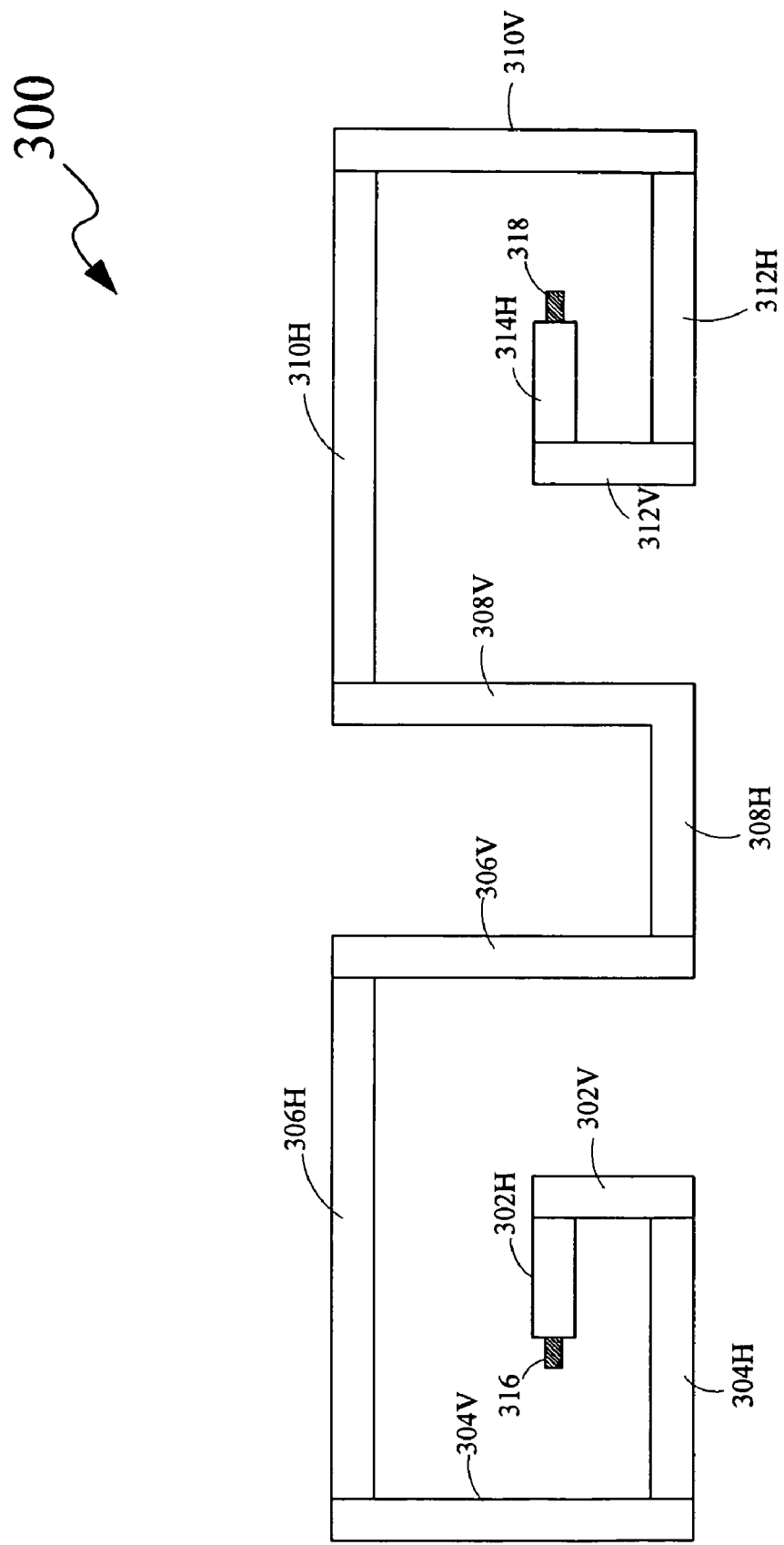
FIG. 3 is a schematic diagram of an antenna module of the printing device, according to an embodiment of the present disclosure.

Referring now to FIG. 3, a schematic diagram of an antenna module 300 of printing device 100 is shown, according to an exemplary embodiment of the present disclosure. Antenna module 300 represents an exemplary antenna module that may be used in processing mechanism 104 of printing device 100. In this exemplary embodiment, antenna module 300 is a combination of meander and spiral patterns forming a single antenna. Antenna module 300 includes a transmission line, a source and a termination. In this embodiment, the transmission line includes a first set of horizontal legs such as horizontal legs 302H, 304H, 306H, 308H, 310H, 312H and 314H (collectively referred to as 'horizontal legs') and a second set of vertical legs such as vertical legs 302V, 304V, 306V, 308V, 310V and 312V (collectively referred to as 'vertical legs'). The horizontal legs and the vertical legs are serially connected to form the transmission line. The transmission line may be a radiating transmission line, such as a microstrip line or a leaky coaxial cable.

The transmission line is connected to a source and a termination at both ends of the transmission line, respectively. More specifically, end legs of the transmission line, i.e., horizontal legs 302H and 314H are connected to the source 316 and the termination 318, respectively. Without limiting the scope of the present disclosure, the termination 318 may be a resistor of about 50 ohm. Further, in this embodiment, 6 vertical legs and 7 horizontal legs are shown that form the transmission line, however it should not be considered limiting, as the transmission line may also be formed by other combinations of vertical and horizontal legs.

The horizontal legs and vertical legs of the transmission line are combined together to give nearly uniform field distribution in the tag region. Each of the horizontal legs and vertical legs is oriented in such a way that the electric field distributed above antenna module 300 is strong enough to activate RFID tags in either the horizontal polarization (or orientation) or the vertical polarization (or orientation) when positioned in the tag region of the media feedpath. More specifically, antenna module 300 may be configured to produce an electric field strength that is sufficient to activate RFID tags in the far-field. Antenna module 300 emits radiation that covers the width of the entire sheet of the RFID label to allow the RFID tag to be located anywhere on the sheet. An exemplary positioning of the RFID tags on the RFID label is explained in conjunction with FIG. 4.

Figure 4:
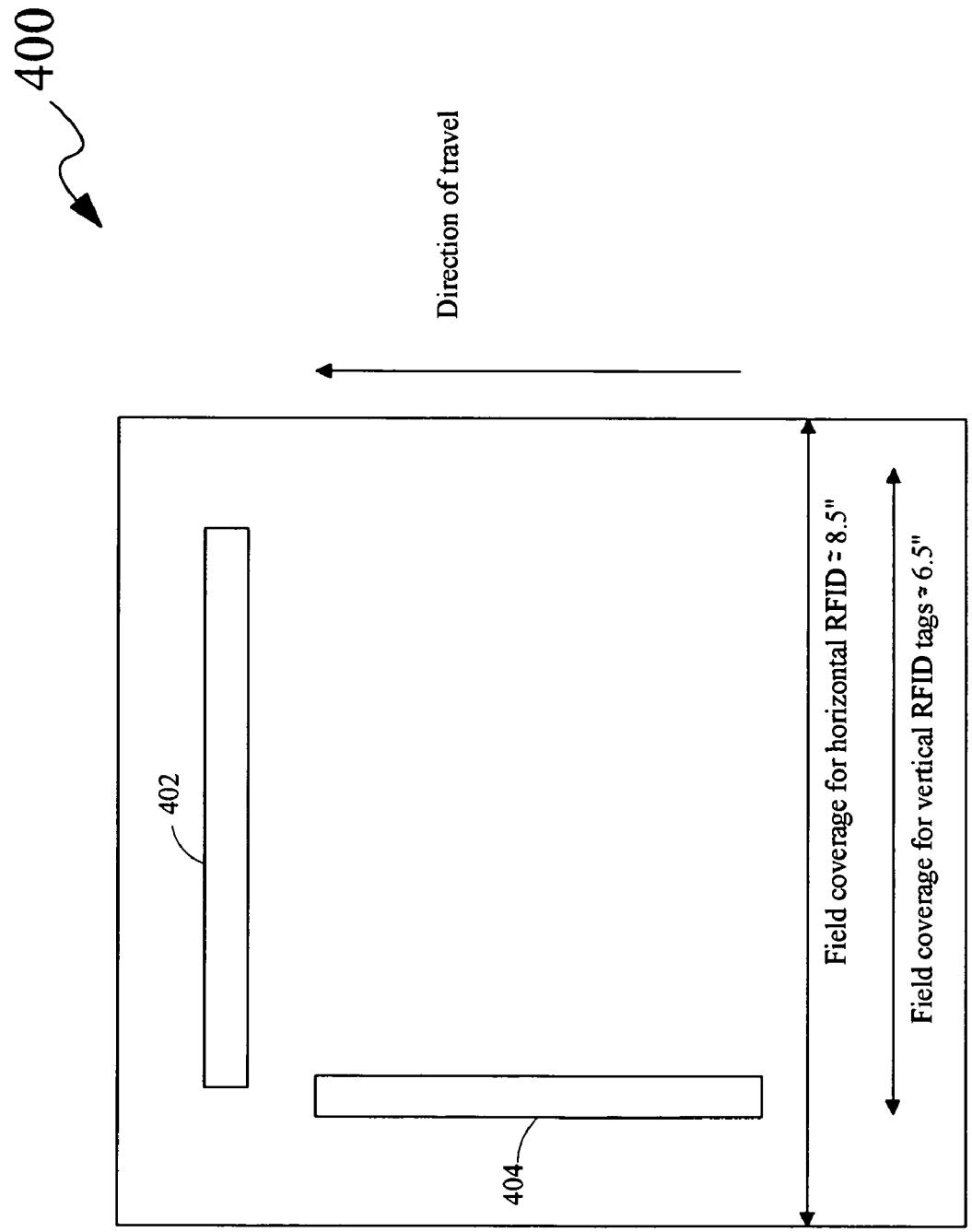
FIG. 4 is a schematic diagram of an exemplary RFID label including RFID tags, according to an embodiment of the present disclosure.

Referring to FIG. 4, positioning of the RFID tags on an exemplary RFID label 400 is shown, in accordance with one embodiment of the present disclosure. A horizontal RFID tag 402 and a vertical RFID tag 404 are shown as placed on RFID label 400 in FIG. 4. The present disclosure provides users options of placing horizontally oriented RFID tags substantially anywhere across the width of RFID label 400. For sheets of RFID labels being 8.5 inches wide, embodiments of the present disclosure allow for a relatively wide area for RFID tag placement. Further, a vertically oriented RFID tag such as vertical RFID tag 404 may be placed at approximately 6.5 inches across RFID label 400 in the vertical direction as shown in FIG. 4. Therefore, the field coverage for horizontal RFID tags and vertical RFID tags may be approximately equal to 8.5 inches and 6.5 inches, respectively, and the horizontal and vertical RFID tags may be placed within their respective field coverage.

The orientation of an RFID tag on RFID label 400 may be specified in datastream sent to the printing device 100, before start of programming of the RFID tag. Generally, strength of the electric field generated by an antenna module such as antenna module 300 is higher in the horizontal field when compared to the field strength in the vertical field due to limited space in the tag region in the vertical direction. Accordingly, different power settings are required to activate a typical RFID tag depending on the orientation of the RFID tag. Slightly higher power levels are needed to activate the RFID tag in the vertical orientation compared to the RFID tag in the horizontal orientation. In one embodiment, power settings may be automatically adjusted within the printing device depending on the orientation of the RFID tag.

Referring again to FIG. 3, the length and width of each of the horizontal legs and the vertical legs of antenna module 300 may be selected in such a way that antenna module 300 resonates in a frequency band of interest with desired bandwidth. In a typical RFID option of printing device 100, antenna module 300 is disposed over a Flame Retardant 4 (FR4) sheet that is above a ground plane (not shown). Thickness of the FR4 sheet above the ground plane along with the width of the transmission line plays a role in determining bandwidth and resonant frequency of antenna module 300.

In order to avoid possible damage to the radio and increase power transfer to antenna module 300, the input impedance of antenna module 300 is such that the voltage standing wave ratio (VSWR) of antenna module 300 is equal to two or less. Due to these limitations, a single antenna module with 70 MHz bandwidth to cover both the Europe and United State regions from 860 MHz to 930 MHz is difficult to achieve. Accordingly, separate antenna modules may necessary to operate in the European and United State region frequency bands.

The thickness of the FR4 sheet above the ground plane and the width of the transmission line remain the same for both antenna module designs, i.e., for the European region and the US region. Therefore, the present disclosure provides for modifying the length of the transmission line according to the region of interest. In an embodiment of the present disclosure, the length of any of the horizontal legs 302H, 304H, 306H, 308H, 310H, 312H and 314H and any of the vertical legs 302V, 304V, 306V, 308V, 310V and 312V of antenna module 300 may be varied in the US region specific antenna in order to achieve resonance in the frequency range 902-928 MHz compared to the European region specific antenna. Also, a VSWR of less than 2 is achieved in order to avoid damage to the radio and power loss due to such varying of the horizontal legs 302H, 304H, 306H, 308H, 310H, 312H, and 314H and any of the vertical legs 302V, 304V, 306V, 308V, 310V and 312V.

The printing device described above in conjunction with FIGS. 1 to 4, includes an antenna module, such as antenna module 300, which may activate RFID tags placed in both the horizontal and vertical polarizations. However, the present disclosure is not limited to only the antenna module that includes each of the horizontal legs and the vertical legs. In one embodiment of the present disclosure, the printing device may include an antenna module, which may include one or more transmitting legs. The one or more transmitting legs may be either horizontal legs or vertical legs, and these transmitting legs may activate the RFID tags having either the horizontal orientation or the vertical orientations, respectively.

Various embodiments of the present disclosure offer the following advantages. The present disclosure provides a single antenna design, which can support both of the horizontal and vertical orientations of RFID tags on RFID labels. Further, the printing device includes an antenna module such as antenna module 300, which may be modified in length in order to operate within different frequency ranges in different regions, such as the European region and the US region. Furthermore, the present disclosure provides the antenna module and the radio systems, which are very simple in design and may be easily integrated with an existing printer.

The foregoing description of several methods and an embodiment of the present disclosure have been presented for purposes of illustration. It is not intended to be exhaustive or to limit the present disclosure to the precise steps and/or forms disclosed, and obviously many modifications and variations are possible in light of the above description. It is intended that the scope of the present disclosure be defined by the claims appended hereto.

What is claimed is:

1. A printing device for printing Radio Frequency Identification (RFID) labels, the printing device comprising:
   an input media drawer configured to receive a plurality of RFID labels, each RFID label of the plurality of RFID labels including at least one RFID tag;
   an RFID label processing mechanism operatively coupled to the input media drawer, the RFID label processing mechanism comprising:
      a radio system for providing a signal for processing of the at least one RFID tag of the RFID label, the RFID label received from the input media drawer, and
      an antenna module coupled to the radio system for processing the at least one RFID tag by the radio system using the signal, the antenna module comprising a transmission line, wherein the transmission line comprises a combination of a first set of horizontal legs and a second set of vertical legs, the first set of horizontal legs and the second set of vertical legs connected serially such that each horizontal leg adjoins at least one vertical leg and each vertical leg adjoins at least one horizontal leg, the radio system and the antenna module configured to process RFID tags positioned both horizontally and vertically on the RFID labels; and
   a printing mechanism operatively coupled to the RFID label processing mechanism for printing on the plurality of RFID labels.

2. The printing device of claim 1, wherein processing of the at least one RFID tag comprises reading of the at least one RFID tag, writing to the at least one RFID tag and verifying the at least one RFID tag.

3. The printing device of claim 1, wherein the first set of horizontal legs comprises seven horizontal legs and the second set of vertical legs comprises six vertical legs.

4. The printing device of claim 1, wherein end legs of the transmission line are horizontal legs.

5. The printing device of claim 1, wherein the transmission line comprises a combination of meandering and spiral sections forming a single antenna.

6. The printing device of claim 1, wherein the transmission lines forms a substantially G-shape, a substantially inverted G-shape and a substantially U-shape disposed therebetween.

7. The printing device of claim 1, wherein the transmission line is a radiating transmission line.

8. The printing device of claim 1, wherein the antenna module is configured to generate an electric field to process the at least one RFID tag, the at least one RFID tag being at least one of horizontally oriented on the each RFID label and vertically oriented on the each RFID label.

9. A Radio Frequency Identification (RFID) label processing mechanism for use in a printing device for printing on RFID labels, the RFID labels including RFID tags, the RFID label processing mechanism comprising:
   a radio system for providing a signal for processing of an RFID tag of an RFID label; and
   an antenna module coupled to the radio system, the antenna module comprising a transmission line, wherein the transmission line comprises a combination of a first set of horizontal legs and a second set of vertical legs, the first set of horizontal legs and the second set of vertical legs connected serially such that each horizontal leg adjoins at least one vertical leg and each vertical leg adjoins at least one horizontal leg, the radio system and the antenna module configured for processing both horizontally and vertically disposed RFID tags.

10. The RFID label processing mechanism of claim 9, wherein processing of the RFID tag comprises at least one of reading of the RFID tag, writing to the RFID tag and verifying the RFID tag.

11. The RFID label processing mechanism of claim 9, wherein the first set of horizontal legs comprises seven horizontal legs and the second set of vertical legs comprises six vertical legs.

12. The RFID label processing mechanism of claim 9, wherein end legs of the transmission line are horizontal legs of the first set of horizontal legs.

13. The RFID label processing mechanism of claim 9, wherein the transmission line comprises a combination of meandering and spiral sections forming a single antenna.

14. The RFID label processing mechanism of claim 13, wherein the transmission line forms a substantially G shape, a substantially inverted G shape, and a substantially U shape disposed between the substantially G shape and the substantially inverted G shape.

15. The RFID label processing mechanism of claim 9, wherein the transmission line forms a substantially G-shaped section, a substantially inverted G-shaped section and a substantially U-shaped section disposed therebetween.

16. The RFID label processing mechanism of claim 9, wherein the radio system and the antenna module are configured to generate an electric field to process the at least one RFID tag, the at least one RFID tag being at least one of horizontally oriented on the each RFID label and vertically oriented on the each RFID label.

17. The RFID label processing mechanism of claim 9, wherein one end of the transmission line is connected to a source and another end of the transmission line is connected to a terminating resistance.

18. The RFID label processing mechanism of claim 9, wherein the transmission line has a first half portion and a second half portion coupled to the first half portion, the second half portion being a substantially mirror image of the first half portion.

19. The RFID label processing mechanism of claim 9, wherein the transmission line forms at least one of a substantially G-shape combined with a substantially U-shape, a substantially inverted G-shape combined with a substantially U-shape, and a substantially G-shape combined with a substantially inverted G-shape.

20. A printing device for printing on Radio Frequency Identification (RFID) labels, the printing device comprising:
   an input media drawer configured to receive a plurality of RFID labels, each RFID label of the plurality of RFID labels including at least one RFID tag;
   an RFID label processing mechanism operatively coupled to the input media drawer for processing both vertically and horizontally disposed RFID tags on the RFID labels, the RFID label processing mechanism comprising:
      a radio system for providing a signal for processing of the at least one RFID tag of each RFID label as each RFID label is moved from the input media drawer, and an antenna module coupled to the radio system for processing the at least one RFID tag by the radio system based on the signal, the antenna module comprising a transmission line, wherein the transmission line comprising one or more transmitting legs; and a printing mechanism operatively coupled to the RFID label processing mechanism for printing on the plurality of RFID labels.

21. The printing device of claim 20, wherein processing of the at least one RFID tag comprises reading of the at least one RFID tag, writing to the at least one RFID tag and verifying the at least one RFID tag.

22. The printing device of claim 20, wherein the one or more transmitting legs are coupled together to form a substantially G-shaped section, a substantially inverted G-shaped section and a substantially U-shaped section disposed between the substantially G-shaped section and the substantially inverted G-shaped section.

23. The printing device of claim 20, wherein the transmission line has a first half portion and a second half portion coupled to the first half portion, the second half portion being a substantially mirror image of the first half portion.

* * * * *